United States Patent
Ando et al.

(10) Patent No.: US 10,882,368 B2
(45) Date of Patent: Jan. 5, 2021

(54) AMPHIBIOUS VEHICLE

(71) Applicant: MITSUBISHI HEAVY INDUSTRIES, LTD., Tokyo (JP)

(72) Inventors: Yoshito Ando, Tokyo (JP); Satoru Ishikawa, Tokyo (JP); Tadashi Sugimura, Tokyo (JP); Takashi Matsunaga, Tokyo (JP); Shinichi Sato, Tokyo (JP); Tetsuya Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/488,292

(22) PCT Filed: Feb. 16, 2018

(86) PCT No.: PCT/JP2018/005528
§ 371 (c)(1),
(2) Date: Aug. 23, 2019

(87) PCT Pub. No.: WO2018/155343
PCT Pub. Date: Aug. 30, 2018

(65) Prior Publication Data
US 2019/0375258 A1     Dec. 12, 2019

(30) Foreign Application Priority Data
Feb. 27, 2017   (JP) .................................. 2017-035341

(51) Int. Cl.
*B63H 19/08*   (2006.01)
*B60F 3/00*    (2006.01)
(Continued)

(52) U.S. Cl.
CPC ............. *B60F 3/003* (2013.01); *B63H 9/061* (2020.02); *F16F 9/103* (2013.01); *B62D 55/12* (2013.01); *B63H 1/14* (2013.01); *B63H 11/02* (2013.01)

(58) Field of Classification Search
CPC ........ B60F 3/00; B60F 3/0007; B60F 3/0015; B60F 3/003; B60F 3/0038; B60F 3/0046;
(Continued)

(56) References Cited

U.S. PATENT DOCUMENTS 3,670,684 A   6/1972   Helker
5,765,497 A   6/1998   Thomas et al.
(Continued)

FOREIGN PATENT DOCUMENTS

JP   2014-108691 A   6/2014

OTHER PUBLICATIONS

Office Action dated May 12, 2020 issued in corresponding Japanese Patent Application No. 2019-501289 with a machine translation.

*Primary Examiner* — Daniel V Venne
(74) *Attorney, Agent, or Firm* — Birch, Stewart, Kolasch & Birch, LLP

(57) ABSTRACT

This amphibious vehicle is provided with a body (11), a traveling device (12) that causes the body (11) to travel on land, a sailing device (13) that causes the body (11) to sail on water, a front flap (31) of which the distal end is inclined upward and the proximal end is rotatably supported by a horizontal shaft (34) on the front end of the body (11), a hydraulic damper (32) serving as a damping member that damps displacement of the front flap (31) relative to the body (11), and a compression coil spring (33) serving as a restoring member that restores the position of the front flap (31) relative to the body (11).

19 Claims, 7 Drawing Sheets

(51) Int. Cl.
  *F16F 9/10* (2006.01)
  *B63H 9/061* (2020.01)
  *B62D 55/12* (2006.01)
  *B63H 1/14* (2006.01)
  *B63H 11/02* (2006.01)

(58) Field of Classification Search
  CPC ........... B60F 3/0061; B63H 9/00; B63H 9/06; B63H 9/067; B63H 9/0607; F16F 9/10; F16F 9/103; B62D 55/12
  USPC ........... 440/12.5, 12.51, 12.56, 12.57, 12.63, 440/12.64
  See application file for complete search history.

(56) References Cited

U.S. PATENT DOCUMENTS

| | | | |
|---|---|---|---|
| 8,002,596 B2* | 8/2011 | Wernicke | B60F 3/0007 114/285 |
| 9,493,046 B2* | 11/2016 | Dick | B63B 27/143 |
| 2014/0113512 A1* | 4/2014 | Dick | B63B 27/143 440/12.52 |
| 2017/0021900 A1* | 1/2017 | Dick | B60F 3/0007 |

* cited by examiner

AMPHIBIOUS VEHICLE

TECHNICAL FIELD

The present invention relates to an amphibious vehicle which can move on land and water.

BACKGROUND ART

An amphibious vehicle can move on land by a traveling device and can move on water by a sailing device. In the amphibious vehicle, a front flap is supported in an inclined state by a suspension device at a front portion of a vehicle body. This suspension system is constituted by a cylinder and a piston, and can absorb a fluid load when the amphibious vehicle sails over water.

For example, as this amphibious vehicle, there is an amphibious vehicle disclosed in PTL 1 below.

CITATION LIST

Patent Literature

[PTL 1] Japanese Unexamined Patent Application Publication No. 2014-108691

SUMMARY OF INVENTION

Technical Problem

As described above, when the amphibious vehicle sails on water, the fluid load acts on the front flap, and the suspension device absorbs this fluid load. Meanwhile, the fluid load acting on the front flap largely fluctuates due to a sailing speed of the amphibious vehicle, a wave resistance by weather, or the like. Since the suspension device of the related art is constituted by a cylinder and a piston, the suspension device has an absorption effect for a fluid load having a predetermined cycle. However, it is difficult to obtain a sufficient absorption effect for a fluid load having a cycle other than the predetermined cycle. Accordingly, the front flap cannot appropriately absorb the fluid load, and thus, there is a concern that the front flap may be damaged.

The present invention solves the above-described problems, and an object thereof is to provide an amphibious vehicle which effectively absorbs a fluid load having a wide range of cycle so as to suppress damages.

Solution to Problem

In order to achieve the above-described object, according to an aspect of the present invention, there is provided an amphibious vehicle including: a vehicle body; a traveling device which causes the vehicle body to travel on land; a sailing device which causes the vehicle body to sail on water; a front flap of which a distal end portion is inclined upward and a proximal end portion is rotatably supported by a front end portion of the vehicle body via a horizontal shaft; a damping member which dampens displacement of the front flap with respect to the vehicle body; and a restoring member which restores a position of the front flap with respect to the vehicle body.

Accordingly, when the vehicle body sails on water by the sailing device, the front flap receives a fluid load. In this case, the damping member dampens displacement of the front flap with respect to the vehicle body, the restoring member restores a position of the front flap with respect to the vehicle body, and thus, it is possible to effectively absorb the fluid load. As a result, the damping member and the restoring member absorb the fluid loads having different cycles, it is possible to effectively absorb the fluid load having a wide range of cycle, and it is possible to suppress damages of the damping member or the restoring member.

In the amphibious vehicle of the present invention, the damping member and the restoring member are disposed in parallel between the vehicle body and the front flap.

Therefore, the damping member and the restoring member are disposed in parallel, and thus, it is possible to improve assemblability.

In the amphibious vehicle of the present invention, the damping member is a hydraulic damper, the restoring member is a compression coil spring, and the compression coil spring is disposed around the hydraulic damper.

Accordingly, the compression coil spring serving as the restoring member is disposed around the hydraulic member serving as the damping member, and thus, an effective usage of a space is improved, and it is possible to simplify a structure and reduce a size thereof.

In the amphibious vehicle of the present invention, a plurality of the damping members are provided, and the restoring member are disposed to be arranged beside the plurality of damping members.

Accordingly, the restoring member is disposed beside the damping member, and thus, the damping member and the restoring member are disposed in a state of being exposed to an outside, and it is possible to improve maintainability.

In the amphibious vehicle of the present invention, the damping member and the restoring member are disposed in series between the vehicle body and the front flap.

Accordingly, the damping member and the restoring member are disposed in series, and thus, it is effectively use a space portion beside the damping member and the restoring member.

In the amphibious vehicle of the present invention, the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

Accordingly, when the front flap is used, the first front flap and the second front flap are linearly disposed, and when the front flap is not used, the second front flap rotates to the vehicle body side with respect to the first front flap. Accordingly, it is possible to effectively use the second front flap.

In the amphibious vehicle of the present invention, the front flap includes a first flap plate, a second flap, and a shock absorbing material which is disposed between the first flap plate and the second flap.

Accordingly, when the front flap receives the fluid load, the shock absorbing material dampens the displacement of the front flap with respect to the vehicle body, the damping member dampens the displacement of the front flap with respect to the vehicle body, and thus, it is possible to effectively absorb the fluid load.

According to another aspect of the present invention, there is provided an amphibious vehicle including: a vehicle body; a traveling device which causes the vehicle body to travel on land; a sailing device which causes the vehicle body to sail on water; and a front flap of which a distal end portion is inclined upward and a proximal end portion is rotatably supported by a front end portion of the vehicle body via a horizontal shaft, in which the front flap includes a first flap plate, a second flap, and a shock absorbing material which is disposed between the first flap plate and the second flap.

Accordingly, when the vehicle body sails on water by the sailing device, the front flap receives the fluid load. In this case, the shock absorbing material dampens the displacement of the front flap with respect to the vehicle body and restores the position of the front flap with respect to the vehicle body, and thus, it is possible to effectively absorb the fluid load. As a result, it is possible to effectively absorb the fluid load having a wide range of cycle, and it is possible to suppress damages.

Advantageous Effects of Invention

According to the amphibious vehicle of the present invention, it is possible to effectively absorb the fluid load having a wide range of cycle, and it is possible to suppress damages. In addition, it is possible to reduce a motion of the vehicle body, and it is possible to improve a ride quality of an occupant.

DESCRIPTION OF EMBODIMENTS

Hereinafter, preferred embodiments of an amphibious vehicle according to the present invention will be described in detail with reference to the accompanying drawings. In addition, the present invention is not limited by the embodiment, and in a case where there are a plurality of embodiments, the present invention also includes those configured by combining the embodiments.

First Embodiment

Figure 1:
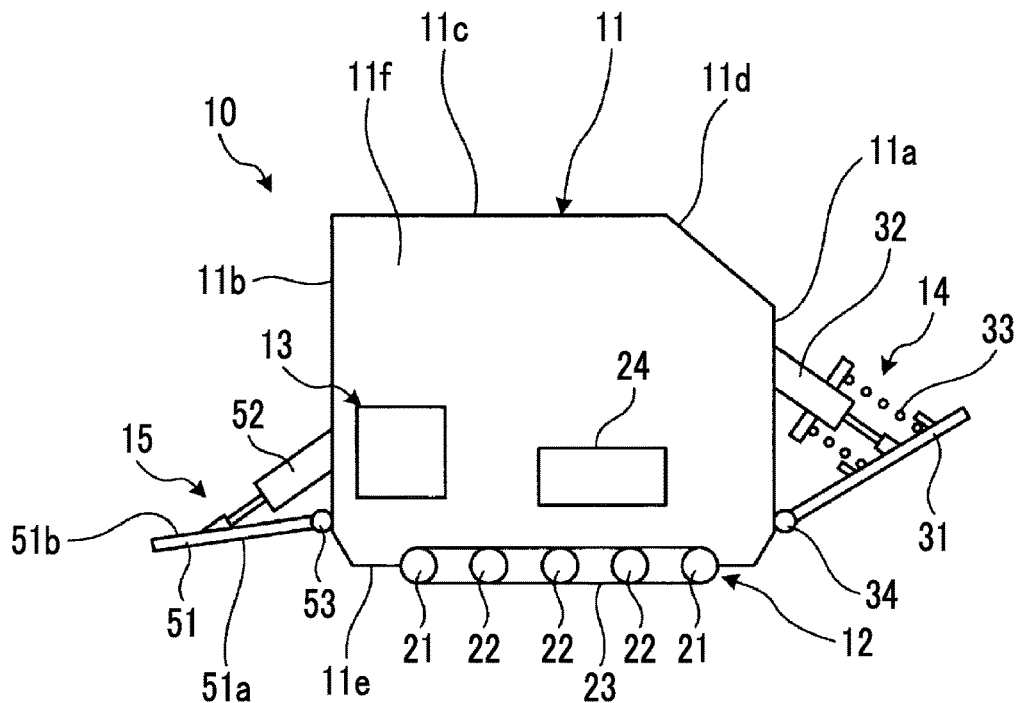
FIG. 1 is a schematic side view showing an amphibious vehicle of a first embodiment.
Figure 2:
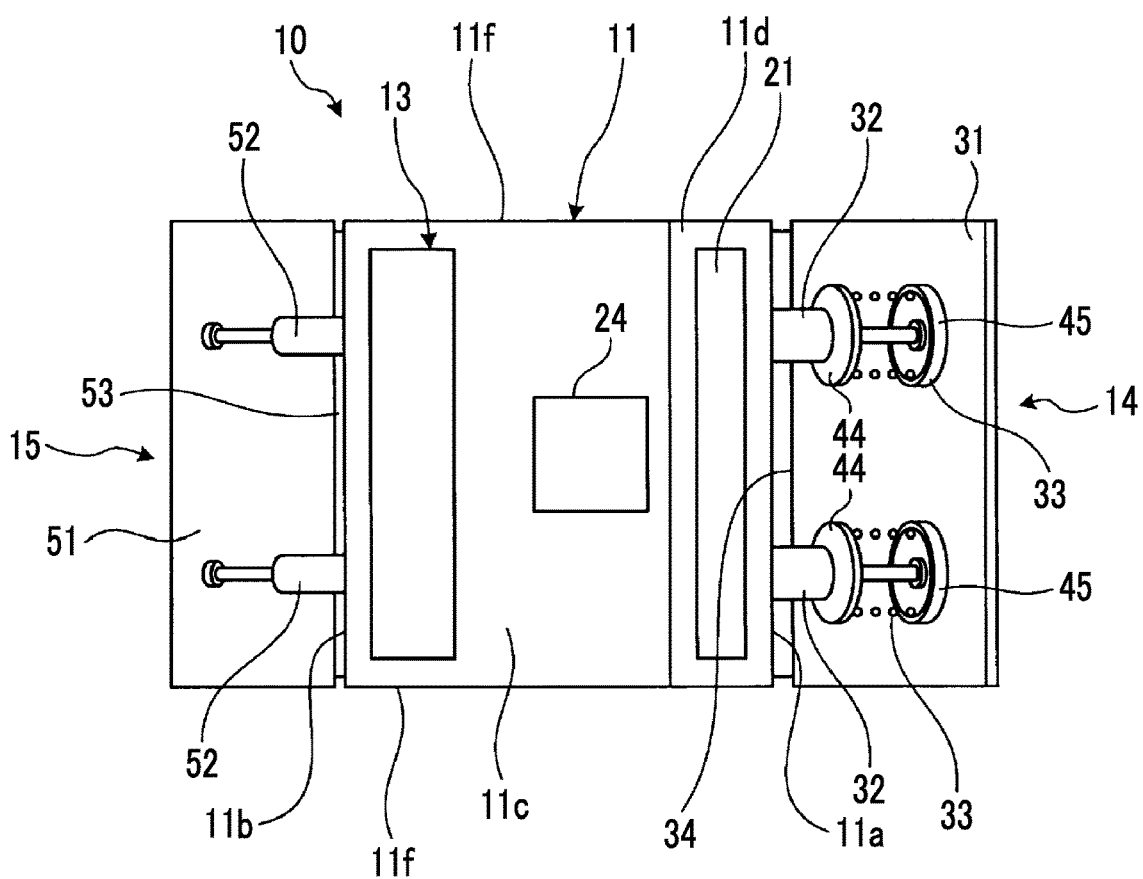
FIG. 2 is a schematic plan view showing the amphibious vehicle.
Figure 3:
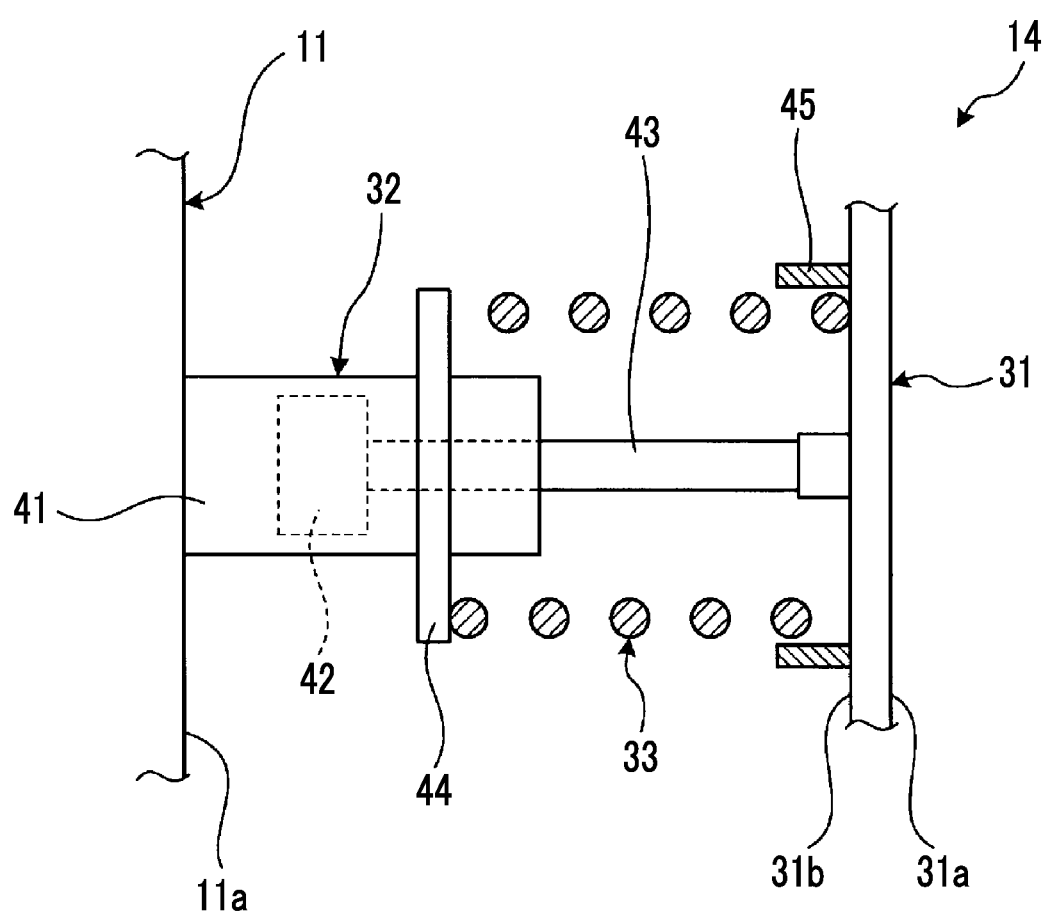
FIG. 3 is a schematic view showing an attachment structure of a damping member and a restoring member.

FIG. 1 is a schematic side view showing an amphibious vehicle of a first embodiment, FIG. 2 is a schematic plan view showing the amphibious vehicle, and FIG. 3 is a schematic view showing an attachment structure of a damping member and a restoring member.

In the first embodiment, as shown in FIG. 1, the amphibious vehicle 10 includes a vehicle body 11, a traveling device 12, a sailing device 13, a front flap device 14, and a rear flap device 15.

The vehicle body 11 has a hollow box shape and includes a front surface section 11a, a rear surface section 11b, a ceiling section 11c, an inclined section 11d, a bottom surface section 11e, and a side surface section 11f.

The traveling device 12 has a pair of front and rear driving sprockets 21 which is rotatably supported on each side surface section 11f of the vehicle body 11, a plurality of driven sprockets 22 which are rotatably supported between the pair of front and rear driving sprockets 21 on each side surface section 11f of the vehicle body 11, an endless crawler 23 which is wound around the sprockets 21 and 22, and a drive unit (for example, an engine, a motor, or the like) 24 which rotates the driving sprocket 21. Accordingly, the driving sprockets 21 are rotated by the drive unit 24, the crawler 23 rotates, and thus, the vehicle body 11 can move forward or rearward on land. In addition, the traveling device 12 is not limited to the above-described configuration, and for example, may be a wheel which is rotated by the drive unit. The sailing device 13 is a conventional marine propulsion device including a propeller or a water jet, and the marine propulsion device is driven to move the vehicle body 11 forward or backward on water.

The front flap device 14 includes a front flap 31, hydraulic dampers (damping members) 32, and compression coil springs (restoring members) 33. The front flap 31 is a flat plate material having a predetermined size and a rectangular shape, a distal end portion thereof is inclined upward, and a proximal end portion thereof is rotatably attached to a front end portion in the bottom surface section 11e of the vehicle body 11 by a horizontal shaft 34. When the amphibious vehicle 10 sails on water, the front flap 31 receives a fluid load from a front surface section 31a and obtains a lift force to lift the vehicle body 11, and an inclination angle is set to an appropriate angle according to an environment in which the amphibious vehicle 10 is used. In addition, the front flap 31 may be rotatably attached to a lower surface of the bottom section 11e or the front surface section 11a as long as the proximal end portion of the front flap 31 is attached to a front side of the vehicle body 11.

A plurality of hydraulic dampers 32 and compression coils spring 33 (in the present embodiment, two hydraulic dampers 32 and two compression coil springs 33) are installed between the front surface section 11a of the vehicle body 11 and the distal end portion side of the front flap 31, and are disposed at a predetermined interval in a width direction of the vehicle body 11. Each hydraulic damper 32 functions as a damping member which dampens displacement of the front flap 31 with respect to the vehicle body 11 and each compression coil spring 33 functions as a restoring member which restores a position of the front flap 31 with respect to the vehicle body 11.

The hydraulic dampers 32 and the compression coil springs 33 are disposed in parallel between the vehicle body 11 and the front flap 31, and each compression coil spring 33 is disposed around each hydraulic damper 32. As shown in FIG. 3, the hydraulic damper 32 has a cylinder 41, a piston 42 which is accommodated in the cylinder 41 to be movable in an axial direction, and a rod 43 of which one end portion is connected to the piston 42 and the other end portion protrudes outward from the cylinder 41 in the axial direction, and both sides of the piston 42 in the cylinder 41 are filled with oil. In addition, in the hydraulic damper 32, a proximal end portion of the cylinder 41 is mounted on the front surface section 11a of the vehicle body 11, and a distal end portion of the rod 43 is connected to a rear surface section 31b of the front flap 31. In this case, it is preferable that at least the distal end portion of the rod 43 and the front flap 31 are in a connection relationship between a pin and a long hole.

In addition, in the hydraulic damper 32, a flange portion 44 having a disk shape is fixed to an outer peripheral portion of the cylinder 41. Meanwhile, the front flap 31 includes a spring receiving ring 45 which has a cylindrical shape around a connection position between the rear surface section 31b and the rod 43. The compression coil spring 33 is disposed outside the hydraulic damper 32, one end portion thereof is pressed on the flange portion 44 of the cylinder 41, and the other end thereof is pressed on the rear surface section 31b inside the spring receiving ring 45 in the front flap 31.

As shown in FIGS. 1 and 2, the rear flap device 15 includes a rear flap 51 and a hydraulic damper 52. The rear flap 51 is a flat plate material having a predetermined size and a rectangular shape, a distal end portion thereof is inclined downward, and a proximal end portion thereof is rotatably attached to a rear end portion in the bottom surface section 11e of the vehicle body 11 by a horizontal shaft 53. When the amphibious vehicle 10 sails on water, a rear surface section 51a receives the fluid load and obtains a lift force to lift the vehicle body 11, and an inclination angle is set to an appropriate angle according to an environment in which the amphibious vehicle 10 is used. In addition, the rear flap 51 may be rotatably attached to the lower surface of the bottom section 11e or the rear surface section 11b as long as the proximal end portion of the rear flap 51 is attached to a rear side of the vehicle body 11.

A plurality of hydraulic dampers 52 (in the present embodiment, two hydraulic dampers 52) are installed between the rear surface section 11b of the vehicle body 11 and the distal end portion side of the rear flap 51, and are disposed at a predetermined interval in the width direction of the vehicle body 11. Similarly to the hydraulic damper 32, the hydraulic damper 52 functions as a damping member which dampens displacement of the rear flap 51 with respect to the vehicle body 11. A proximal end portion of the hydraulic damper 52 is mounted on the rear surface section 11b of the vehicle body 11, and a distal end portion thereof is connected to an upper surface portion 51b of the rear flap 51. In this case, it is preferable that at least the distal end portion of the hydraulic damper 52 and the rear flap 51 are in a connection relationship between a pin and a long hole.

Figure 4:
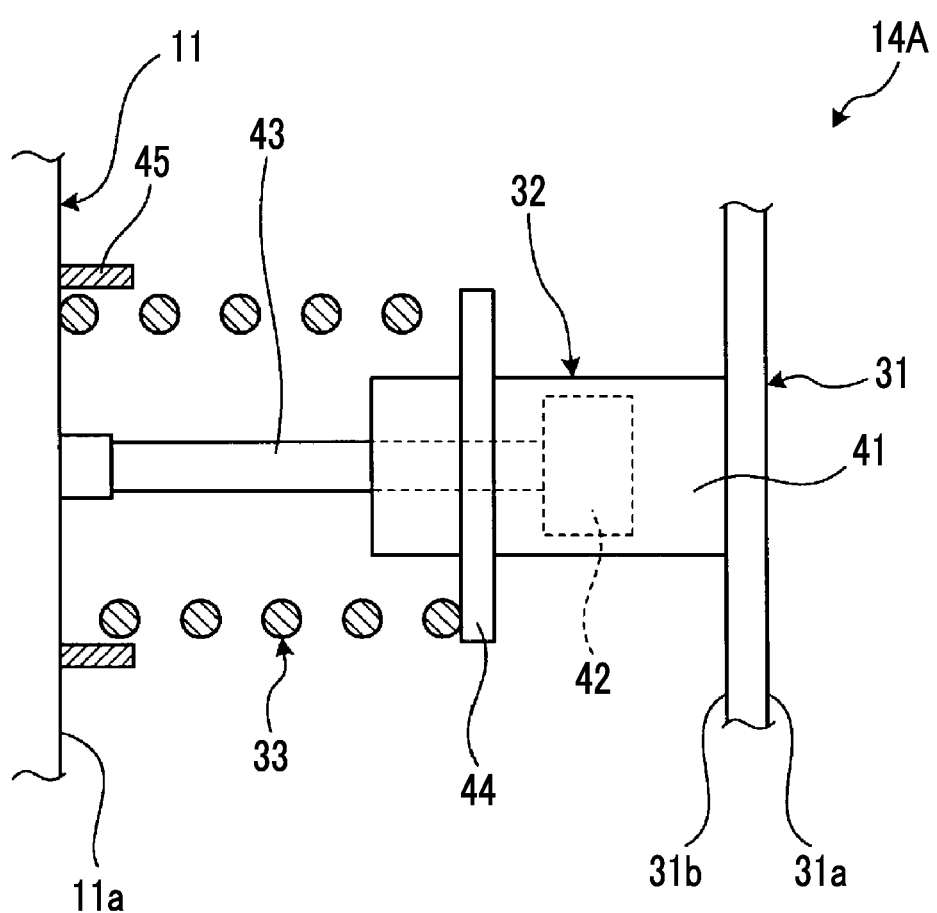
FIG. 4 is a schematic view showing an attachment structure of a damping member and a restoring member showing a first modification example of the amphibious vehicle of the first embodiment.
Figure 5:
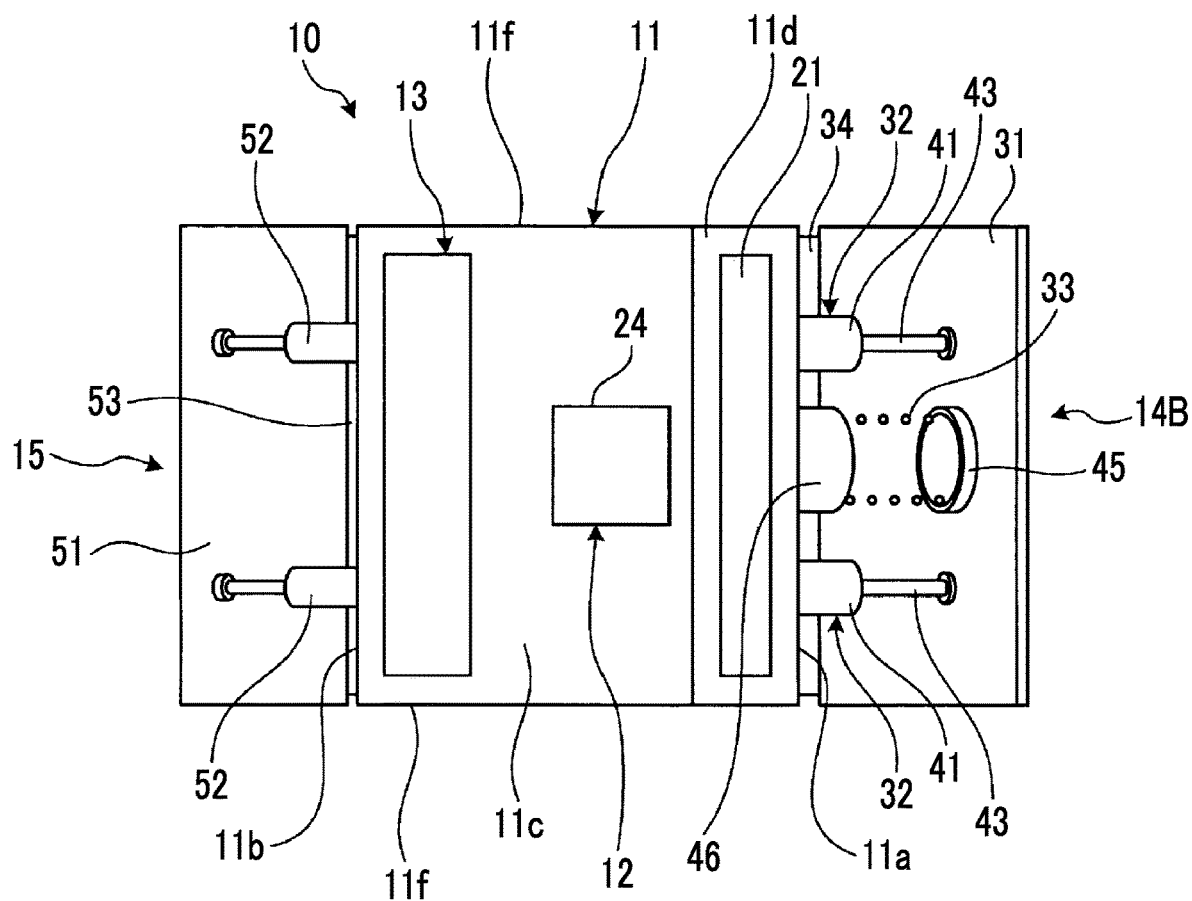
FIG. 5 is a schematic view showing an attachment structure of a damping member and a restoring member showing a second modification example of the amphibious vehicle of the first embodiment.

In addition, a configuration of the front flap device 14 is not limited to the above-described configuration. FIG. 4 is a schematic view showing an attachment structure of a damping member and a restoring member showing a first modification example of the amphibious vehicle of the first embodiment, and FIG. 5 is a schematic view showing an attachment structure of a damping member and a restoring member showing a second modification example of the amphibious vehicle of the first embodiment.

As shown in FIG. 4, a front flap device 14A includes the front flap 31, the hydraulic damper 32, and a compression coil spring 33. The distal end portion of the front flap 31 is inclined upward, and the proximal end portion thereof is rotatably attached to the front end portion in the bottom surface section 11e of the vehicle body 11 by the horizontal shaft 34 (refer to FIG. 1). The hydraulic dampers 32 and the compression coil springs 33 are disposed in parallel between the front surface section 11a of the vehicle body 11 and the front flap 31, and each compression coil spring 33 is disposed around each hydraulic damper 32. In the hydraulic damper 32, the proximal end portion of the cylinder 41 is mounted on the rear surface section 31b of the front flap 31, and the distal end portion of the rod 43 is mounted on the front surface section 11a of the vehicle body 11. In this case, it is preferable that at least the distal end portion of the rod 43 and the front surface section 11a of the vehicle body 11 are in a connection relationship between a pin and a long hole.

In addition, in the hydraulic damper 32, the flange portion 44 having a disk shape is fixed to the outer peripheral portion of the cylinder 41. Meanwhile, the vehicle body 11 includes a spring receiving ring 45 having a cylindrical shape around a connection position between the front surface section 11a and the rod 43. The compression coil spring 33 is disposed outside the hydraulic damper 32, one end portion thereof is pressed on the flange portion 44 of the cylinder 41, and the other end thereof is pressed inside the spring receiving ring 45 in the front surface section 11a of the vehicle body 11.

In addition, the flange portion 44 is fixed to the outer peripheral portion of the cylinder 41 of the hydraulic damper 32, and one end portion of the compression coil spring 33 is pressed on the flange portion 44. However, the flange portion 44 may not be provided, and the one end portion of the compression coil spring 33 may be directly pressed on the rear surface section 31b of the front flap 31 or the front surface section 11a of the vehicle body 11.

In addition, as shown in FIG. 5, a front flap device 14B includes the front flap 31, the hydraulic dampers 32, and the compression coil spring 33. The distal end portion of the front flap 31 is inclined upward, and the proximal end portion thereof is rotatably attached to the front end portion in the bottom surface section 11e of the vehicle body 11 by a horizontal shaft 34. The hydraulic dampers 32 and the compression coil spring 33 are disposed in parallel between the front surface section 11a of the vehicle body 11 and the distal end portion side of the front flap 31, and one compression coil spring 33 is disposed laterally between a plurality of (two in the present embodiment) hydraulic dampers 32. In each hydraulic damper 32, the proximal end portion of the cylinder 41 is mounted on the front surface section 11a of the vehicle body 11, and the distal end portion of the rod is connected to the rear surface section 31b of the front flap 31.

In addition, in the vehicle body 11, a spring receiving ring 46 which is positioned between the hydraulic dampers 32 and has a cylindrical shape is provided on the front surface section 11a. Meanwhile, in the front flap 31, the spring receiving ring 45 which faces the spring receiving ring 46 and has a cylindrical shape is provided on the rear surface section 31b. The compression coil spring 33 is disposed between the hydraulic dampers 32, one end portion of the compression coil spring 33 is supported by the spring receiving ring of the vehicle body 11 and is pressed on the front surface section 11a, and the other end portion thereof is supported by the spring receiving ring 45 of the front flap 31 and is pressed on the rear surface section 32b.

In addition, one compression coil spring 33 is disposed between the two hydraulic dampers 32 between the front surface section 11a of the vehicle body 11 and the rear surface section 31b of the front flap 31. However, here, a plurality of compression coil springs 33 may be disposed. In addition, the compression coil springs 33 may be respectively disposed outside one or the plurality of hydraulic dampers 32.

Accordingly, as shown in FIGS. 1 and 2, when the vehicle body 11 sails on water by the sailing device 13, the front flap 31 receive the fluid load. In this case, the hydraulic dampers 32 dampen the displacement of the front flap 31 with respect to the vehicle body 11, the compression coil springs 33 restore the position of the front flap 31 with respect to the vehicle body 11, and thus, the front flap device 14 absorbs the fluid load acting on the front flap 31.

In general, in the fluid load acting on the front flap 31, a range of a wave cycle is 0.5 seconds to 30 seconds, and if a speed of the amphibious vehicle 10 is 10 km/h to 50 km/h, a range of an encounter wave cycle between the amphibious vehicle 10 and a wave is 0.03 seconds to 30 seconds. In this case, since an action cycle of the fluid load acting on the front flap 31 is 0.03 seconds to 30 seconds, in a case where the action cycle is slow, the compression coil spring 33 absorbs the fluid load, and in a case where the action cycle is early, the hydraulic damper 32 absorbs the fluid load.

In this way, the amphibious vehicle of the first embodiment includes the vehicle body 11, a traveling device 12 which causes the vehicle body 11 to travel on land, a sailing device 13 which causes the vehicle body 11 to sail on water, a front flap 31 of which the distal end portion is inclined upward and the proximal end portion is rotatably supported by the front end portion of the vehicle body 11 via the horizontal shaft 34, the hydraulic damper (damping member) 32 which dampens the displacement of the front flap 31 with respect to the vehicle body 11, and the compression coil spring (restoring member) 33 which restores the position of the front flap 31 with respect to the vehicle body 11.

Accordingly, the hydraulic damper 32 dampens the displacement of the front flap 31 with respect to the vehicle body 11, the compression coil spring 33 restores the position of the front flap 31 with respect to the vehicle body 11, and thus, it is possible to effectively absorb the fluid load. As a result, the hydraulic damper and the compression coil spring 33 absorb the fluid loads having different cycles, it is possible to effectively absorb the fluid load having a wide range of cycle, and it is possible to suppress damages of the hydraulic damper 32 or the compression coil spring 33. In addition, it is possible to reduce a motion of the vehicle body 11, and it is possible to improve a ride quality of an occupant.

In the amphibious vehicle of the first embodiment, the hydraulic dampers 32 and the compression coil springs are disposed in parallel between the vehicle body 11 and the front flap 31. Therefore, the hydraulic damper 32 and the compression coil spring 33 are independently disposed, and thus, it is possible to improve assemblability of the hydraulic damper 32 and the compression coil spring 33.

In the amphibious vehicle of the first embodiment, the compression coil spring 33 serving as the restoring member is disposed around the hydraulic damper 32 serving as the damping member, and thus, a space for disposing the hydraulic damper 32 and the compression coil spring 33 is reduced, an effective usage of a space is improved, and it is possible to simplify a structure and reduce a size thereof.

In the amphibious vehicle of the first embodiment, the plurality of hydraulic dampers 32 are provided, and the compression coil spring 33 is disposed side by side on the sides of the plurality of hydraulic dampers 32. Accordingly, the hydraulic damper 32 and the compression coil spring 33 are disposed in a state of being exposed to an outside, and it is possible to improve maintainability.

Second Embodiment

Figure 6:
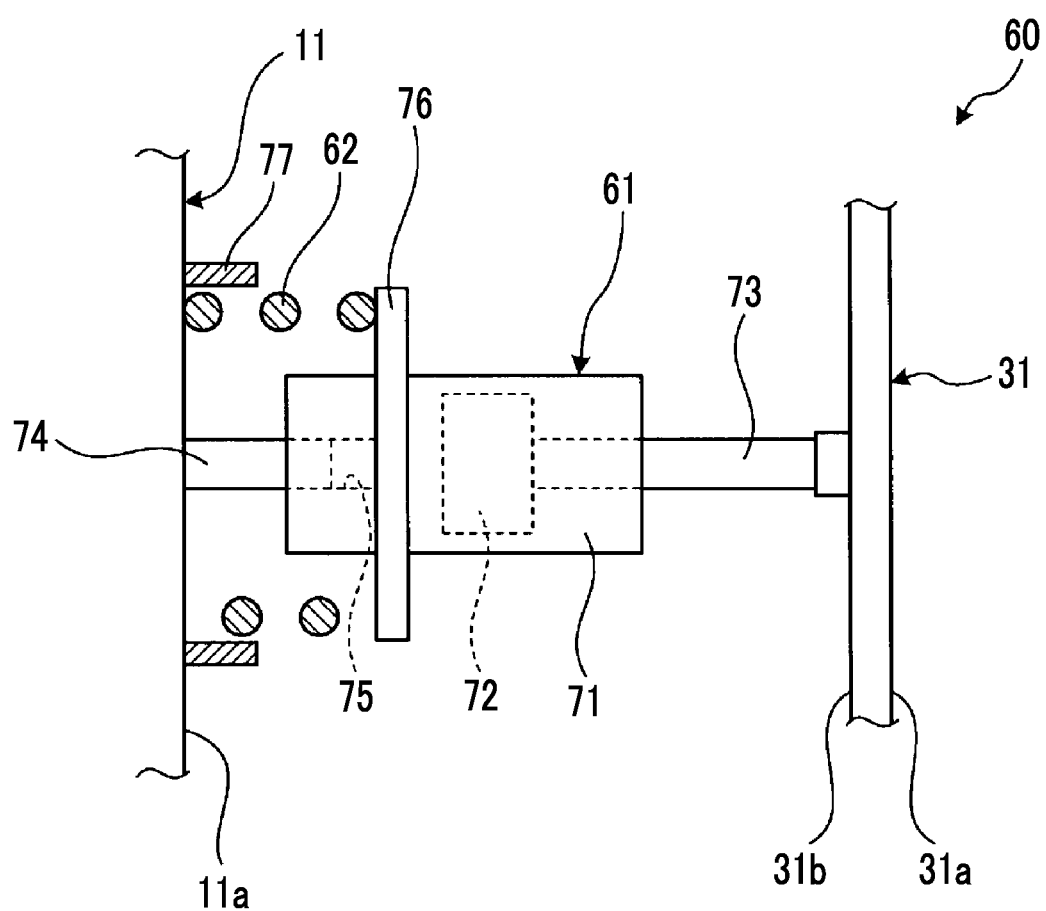
FIG. 6 is a schematic view showing an attachment structure of a damping member and a restoring member in an amphibious vehicle of a second embodiment.

FIG. 6 is a schematic view showing an attachment structure of a damping member and a restoring member in an amphibious vehicle of a second embodiment. Moreover, the same reference signs are assigned to members having the same functions as those of the above-described embodiment, and detail descriptions thereof are omitted.

In the second embodiment, as shown in FIG. 6, a front flap device 60 includes the front flap 31, a hydraulic damper 61 (damping member), and a compression coil spring (restoring member) 62. The distal end portion of the front flap 31 is inclined upward, and the proximal end portion thereof is rotatably attached to the front end portion in the bottom surface section 11e of the vehicle body 11 by the horizontal shaft 34 (refer to FIG. 1). The hydraulic damper 61 and the compression coil spring 62 are disposed in series between the front surface section 11a of the vehicle body 11 and the distal end portion side of the front flap 31.

The hydraulic damper 61 has a cylinder 71, a piston 72 which is accommodated in the cylinder 71 to be movable in an axial direction, and a rod 73 of which one end portion is connected to the piston 72 and the other end portion protrudes outward from the cylinder 71 in the axial direction, and both sides of the piston 72 in the cylinder 71 are filled with oil. Moreover, a support rod is fixed to the front surface section 11a of the vehicle body 11, and a support hole 75 formed in the cylinder 71 is fitted to the support rod 74 to be movable in the axial direction. In addition, in the hydraulic damper 61, a flange portion 76 having a disk shape is fixed to an outer peripheral portion of the cylinder 71. Meanwhile, the vehicle body 11 includes a spring receiving ring 77 which has a cylindrical shape around a fixed position of the support rod 74 on the front surface section 11a. The compression coil spring 62 is disposed outside the cylinder 71 in the hydraulic damper 61, one end portion of the compression coil spring 62 is pressed on the flange portion 76 of the cylinder 71, and the other end portion thereof is pressed on the front surface section 11a inside the spring receiving ring 77. In addition, in the hydraulic damper 61, the support rod 74 fixed to the front surface section 11a of the vehicle body 11 is fitted to the support hole 75 of the cylinder 71 and can move by a predetermined stroke. That is, the hydraulic damper 61 is shrunk by a predetermined stroke, and thereafter, dampening is generated.

Accordingly, when the front flap 31 receives the fluid load, the hydraulic damper 61 dampens the displacement of the front flap 31 with respect to the vehicle body 11, the compression coil spring 62 restores the position of the front flap 31 with respect to the vehicle body 11, and the front flap device 60 absorbs the fluid load acting on the front flap 31. That is, in a case where the action cycle of the fluid load acting on the front flap 31 is slow, the compression coil spring 62 absorbs the fluid load, and in a case where the action cycle is early, the hydraulic damper 61 absorbs the fluid load.

In this way, in the amphibious vehicle of the second embodiment, the hydraulic damper 61 serving as the damping member and the compression coil spring 62 serving as the restoring member are disposed in series between the vehicle body 11 and the front flap 31. Accordingly, it is effectively use a space portion beside the hydraulic damper 61 and the compression coil spring 62.

Third Embodiment

Figure 7:
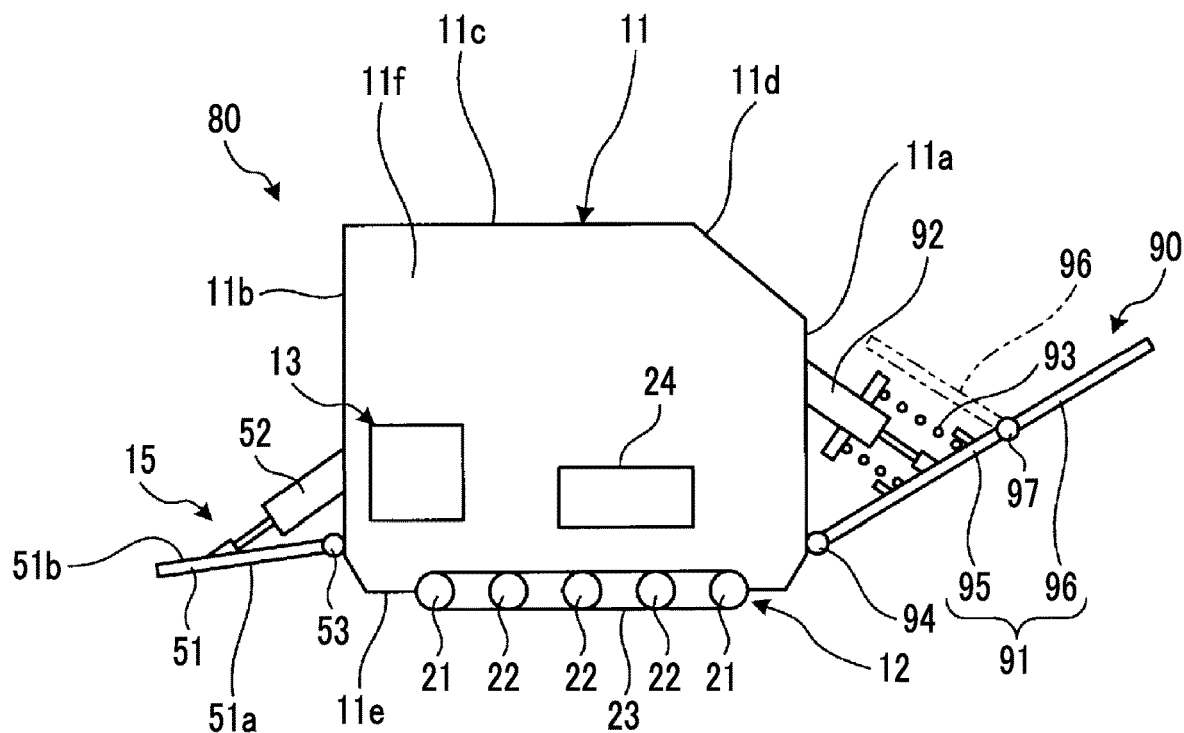
FIG. 7 is a schematic side view showing an amphibious vehicle of a third embodiment.

FIG. 7 is a schematic side view showing an amphibious vehicle of a third embodiment. Moreover, the same reference signs are assigned to members having the same functions as those of the above-described embodiments, and detail descriptions thereof are omitted.

In the third embodiment, as shown in FIG. 7, an amphibious vehicle 80 includes the vehicle body 11, the traveling device 12, the sailing device 13, a front flap device 90, and the rear flap device 15.

The front flap device 90 includes a front flap 91, a hydraulic damper (damping member) 92, and a compression coil spring (restoring member) 93. The front flap 91 is a flat plate material having a predetermined size and a rectangular shape, a distal end portion thereof is inclined upward, and a proximal end portion thereof is rotatably attached to the front end portion in the bottom surface section 11e of the vehicle body 11 by a horizontal shaft 94. When the amphibious vehicle 10 sails on water, the front flap 91 receives the fluid load and obtains a lift force to lift the vehicle body 11, and an inclination angle is set to an appropriate angle according to an environment in which the amphibious vehicle 10 is used.

The front flap 91 is bendably provided by a plurality of plate members. That is, the front flap 91 is configured such that a first front flap 95 and a second front flap 96 are rotatably connected to each other by a connection shaft 97. A proximal end portion of the first front flap 95 is rotatably supported by the front end portion of the vehicle body 11 via the horizontal shaft 94. A proximal end portion of the second front flap 96 is rotatably supported by a distal end portion of the first front flap 95 via the connection shaft 97. The first front flap 95 and the second front flap 96 can move to a use position at which the first front flap 95 and the second front flap 96 are linearly disposed as shown by solid lines in FIG. 7 and a retraction position at which the second front flap 96 rotates to the vehicle body 11 side with respect to the first front flap 95 so as to be folded. In addition, the movement of the second front flap 96 is performed manually or by an actuator (not shown).

The hydraulic damper 92 and the compression coil spring 93 are installed between the front surface section 11a of the vehicle body 11 and the distal end portion side of the front flap 91. The hydraulic damper 92 functions as a damping member which dampens the displacement of the front flap 91 with respect to the vehicle body 11, and the compression coil spring 93 functions as a restoring member which restores the position of the front flap 91 with respect to the vehicle body 11. A proximal end portion of the hydraulic damper 92 is mounted on the front surface section 11a of the vehicle body 11 and a distal end portion of the rod is connected to the front flap 91. The compression coil spring 93 is disposed outside the hydraulic damper 92, one end portion thereof is pressed on the vehicle body 11 side, and the other end portion thereof is pressed on the front flap 91.

Accordingly, when the vehicle body 11 sails on water by the sailing device 13, that is, when the front flap 91 is used, the first front flap 95 and the second front flap 96 move to the use position at which the second front flap is linearly disposed with respect to the first front flap 95. Meanwhile, when the vehicle body 11 travels on land by the traveling device 12, that is, when the front flap 91 is not used, the first front flap 95 and the second front flap 96 move to the retraction position at which the second front flap 96 rotates to the vehicle body 11 side with respect to the first front flap 95 so as to be folded.

In addition, when the front flap 91 receives the fluid load at the use position, the hydraulic damper 92 dampens the displacement of the front flap 91 with respect to the vehicle body 11, the compression coil spring 93 restores the position of the front flap 91 with respect to the vehicle body 11, and the front flap device 90 absorbs the fluid load acting on the front flap 91. That is, in a case where the action cycle of the fluid load acting on the front flap 91 is slow, the compression coil spring 93 absorbs the fluid load, and in a case where the action cycle is early, the hydraulic damper 92 absorbs the fluid load.

In this way, in the amphibious vehicle of the third embodiment, the front flap 91 includes the first front flap 95 of which the proximal end portion is rotatably supported by the front end portion of the vehicle body 11 via the horizontal shaft 94 and a second front flap 96 of which the proximal end portion is rotatably supported by the distal end portion of the first front flap 95 via the connection shaft 97. Accordingly, the second front flap 96 rotates with respect to the first front flap 95 and can move to the use position and the non-use position, and thus, it is possible to effectively use the second front flap 96.

Fourth Embodiment

Figure 8:
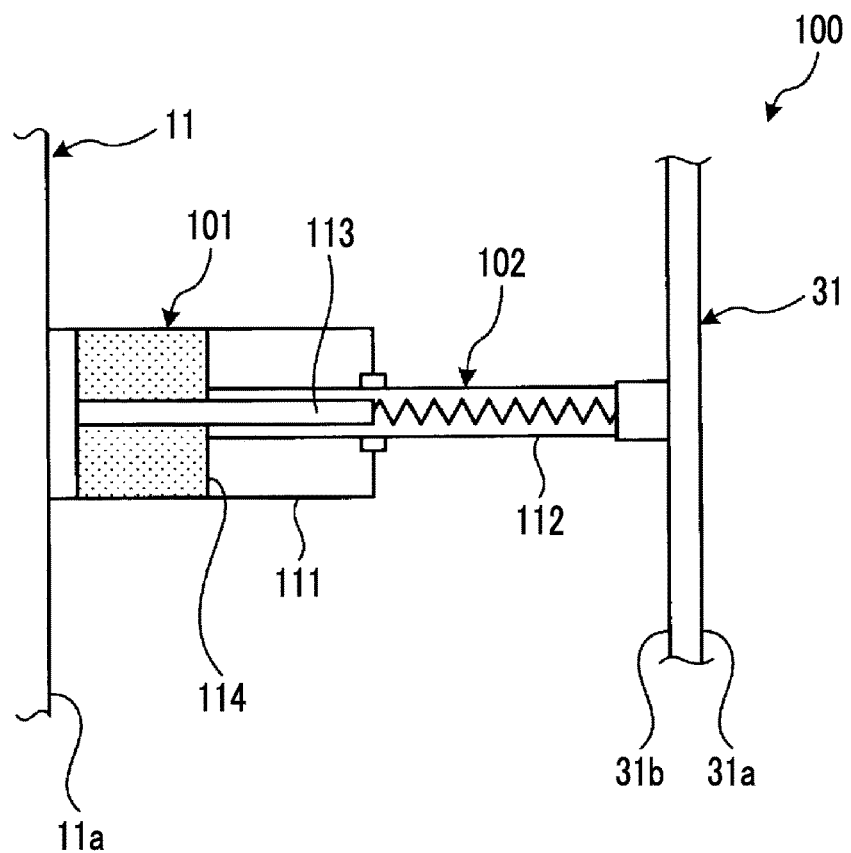
FIG. 8 is a schematic view showing an attachment structure of a damping member and a restoring member in an amphibious vehicle of a fourth embodiment.

FIG. 8 is a schematic view showing an attachment structure of a damping member and a restoring member in an amphibious vehicle of a fourth embodiment. Moreover, the same reference signs are assigned to members having the same functions as those of the above-described embodiments, and detail descriptions thereof are omitted.

In the fourth embodiment, as shown in FIG. 8, a front flap device 100 includes the front flap 31, a hydraulic damper 101 (damping member), and a compression coil spring (restoring member) 102. The distal end portion of the front flap 31 is inclined upward, and the proximal end portion thereof is rotatably attached to the front end portion in the bottom surface section 11e of the vehicle body 11 by the horizontal shaft 34 (refer to FIG. 1). The hydraulic damper 101 and the compression coil spring 102 are disposed in series between the front surface section 11a of the vehicle body 11 and the distal end portion side of the front flap 31.

The hydraulic damper 101 has a first cylinder 111, a second cylinder 112 which is supported by the first cylinder 71 to be movable in an axial direction, a support rod 113 of which one end portion is fixed to a bottom portion of the first cylinder 111 and the other end portion is inserted into the second cylinder 112, and a seal member 114 which is connected to an end portion of the second cylinder 112 and has a disk shape, and a region partitioned by the first cylinder 111 and the seal member 114 is filled with oil. The compression coil spring 102 is pressed on an axial end surface of the support rod 113 by the second cylinder 112. In addition, in the hydraulic damper 101, the bottom portion of the first cylinder 111 is mounted on the front surface section 11a of the vehicle body 11, and a distal end portion of the second cylinder 112 is connected to the rear surface section 31b of the front flap 31.

Accordingly, when the front flap 31 receives the fluid load, the hydraulic damper 101 dampens the displacement of the front flap 31 with respect to the vehicle body 11, the compression coil spring 102 restores the position of the front flap 31 with respect to the vehicle body 11, and the front flap device 100 absorbs the fluid load acting on the front flap 31. That is, in a case where the action cycle of the fluid load acting on the front flap 31 is slow, the compression coil spring 102 absorbs the fluid load, and in a case where the action cycle is early, the hydraulic damper 101 absorbs the fluid load.

In this way, in the amphibious vehicle of the fourth embodiment, the compression coil spring 102 serving as the restoring member is disposed in the hydraulic damper 101 serving as the damping member. Accordingly, it is possible to reduce a size of the device, and it is effectively use a space portion beside the hydraulic damper 101 and the compression coil spring 102.

Fifth Embodiment

Figure 9:
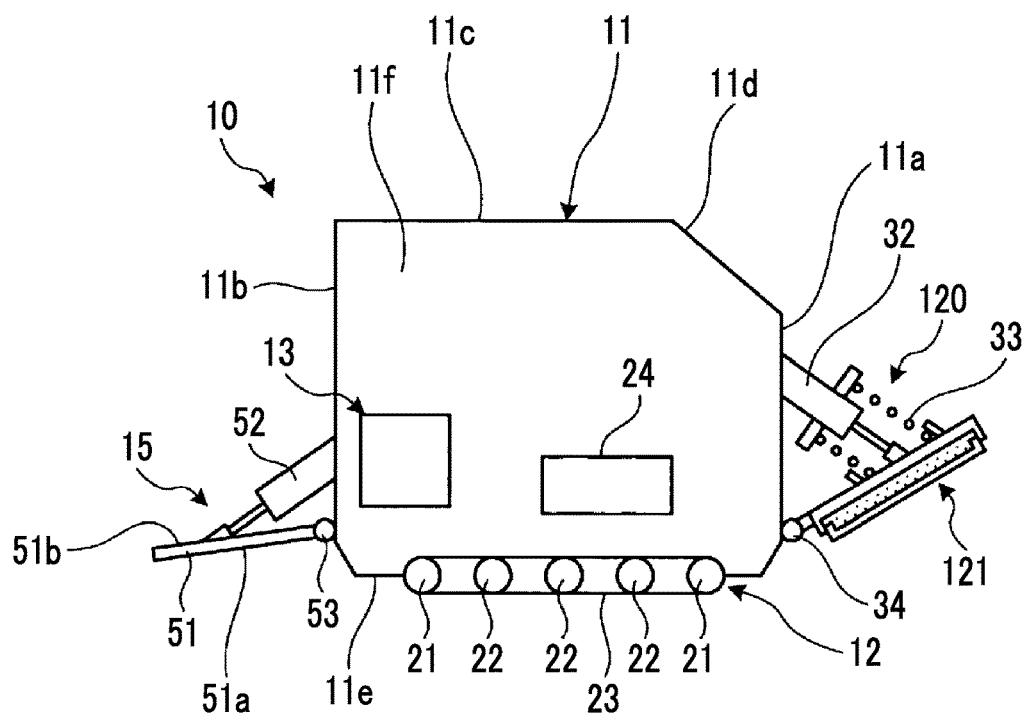
FIG. 9 is a schematic side view showing an amphibious vehicle of a fifth embodiment.
Figure 10:
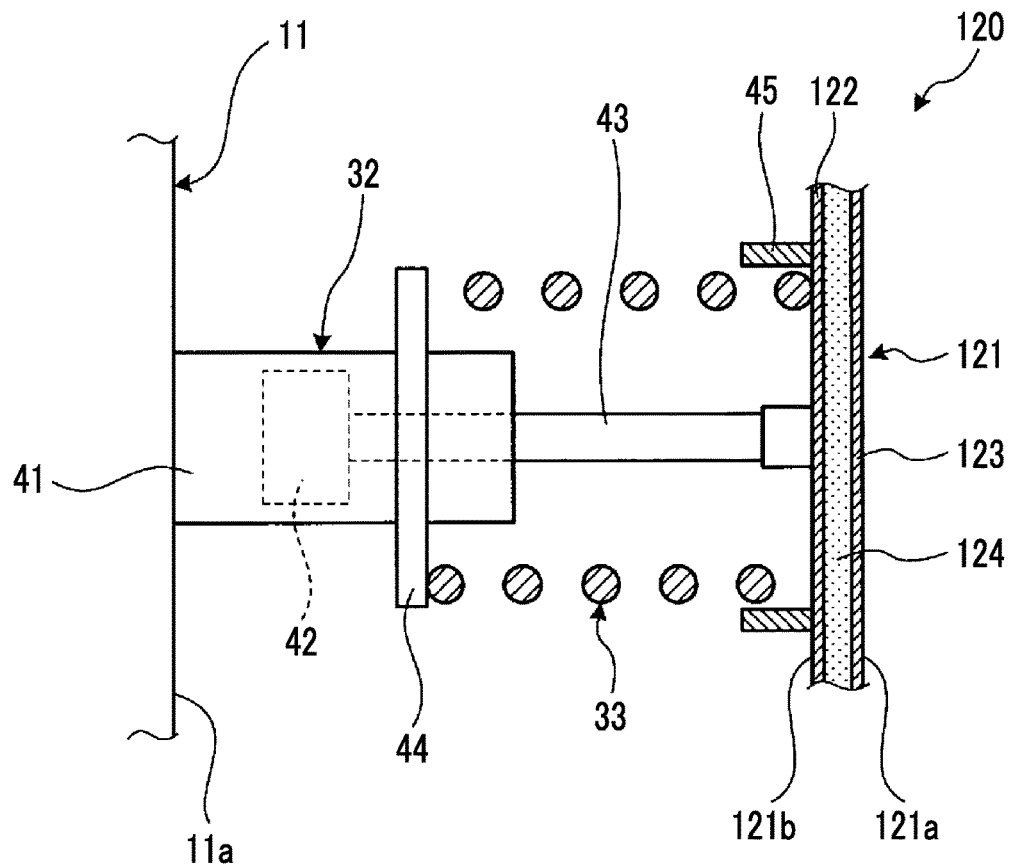
FIG. 10 is a schematic view showing an attachment structure of a damping member and a restoring member.

FIG. 9 is a schematic side view showing an amphibious vehicle of a fifth embodiment, and FIG. 10 is a schematic view showing an attachment structure of a damping member and a restoring member. Moreover, the same reference signs are assigned to members having the same functions as those of the above-described embodiments, and detail descriptions thereof are omitted.

As shown in FIG. 9, in the fifth embodiment, the amphibious vehicle 10 includes the vehicle body 11, the traveling device 12, the sailing device 13, a front flap device 120, and a rear flap device 15.

The front flap device 120 includes a front flap 121, the hydraulic damper 32, and the compression coil spring 33. The front flap 121 is a flat plate material having a predetermined size and a rectangular shape, a distal end portion thereof is inclined upward, and a proximal end portion thereof is rotatably attached to the front end portion in the bottom surface section 11e of the vehicle body 11 by the horizontal shaft 94. When the amphibious vehicle 10 sails on water, the front flap 121 receives the fluid load and obtains a lift force to lift the vehicle body 11, and an inclination angle is set to an appropriate angle according to the environment in which the amphibious vehicle 10 is used. In addition, the front flap 121 has a first flap plate 122, a second flap 123, and a shock absorbing material 124 which is disposed between the first flap plate 122 and the second flap 123.

The first flap plate 122 and the second flap 123 is configured by fitting plate materials having a rectangular shape to each other so as to connect to each other, and can be close to or away from each other in a plate thickness direction. For example, the shock absorbing material 124 is constituted by a shock absorbing gel or a shock absorbing rubber, and is disposed so as to fill a portion between the first flap plate 122 and the second flap 123 without gaps.

The hydraulic damper 92 and the compression coil spring 93 are installed between the front surface section 11a of the vehicle body 11 and a distal end portion side of the front flap 121. The hydraulic damper 32 functions as a damping member which dampens displacement of the front flap 121 with respect to the vehicle body 11 and the compression coil spring 33 functions as a restoring member which restores a position of the front flap 121 with respect to the vehicle body 11. The proximal end portion of the hydraulic damper 32 is mounted on the front surface 11a of the vehicle body 11 and the distal end portion of the rod is connected to the front flap 121. The compression coil spring 33 is disposed outside the hydraulic damper 32, one end portion thereof is pressed on the vehicle body 11 side, and the other end thereof is pressed on the front flap 121.

Accordingly, when the vehicle body 11 sails on water by the sailing device 13, the front surface section 121a of the front flap 121 receives the fluid load. In this case, the shock absorbing material 124 constituting the front flap 121 is shrunk, and thus, displacement of the front flap 121 with respect to the vehicle body 11 is dampened. In addition, the hydraulic damper 32 further dampens the displacement of the front flap 121 with respect to the vehicle body 11, the compression coil spring 33 restores a position of the front flap 121 with respect to the vehicle body 11, and the front flap device 120 absorbs the fluid load acting on the front flap 121. That is, the fluid load acting on the front flap 121 is absorbed in two steps by the shock absorbing material 124 and the hydraulic damper 32.

In this way, in the amphibious vehicle of the fifth embodiment, the front flap 121 includes the first flap plate 122, the second flap 123, and the shock absorbing material 124 which is disposed between the first flap plate 122 and the second flap 123.

Accordingly, when the front flap 121 receives the fluid load, first, the shock absorbing material 124 dampens the displacement of the front flap 121 with respect to the vehicle body 11, the hydraulic damper 32 dampens the displacement of the front flap 31 with respect to the vehicle body 11, and the compression coil spring 33 restores the position of the front flap 31 with respect to the vehicle body 11. Accordingly, it is possible to effectively absorb the fluid load by the shock absorbing material 124 and the hydraulic damper 32. In addition, the shock absorbing material 124 is provided, and thus, it is possible to reduce the size of the hydraulic damper 32.

Moreover, in the above-described embodiments, the hydraulic damper is applied as the damping member, and the compression sprig is applied as the restoring member. However, the present invention is not limited to this configuration. For example, as the damping member, an air damper or an elastic member may be applied in addition to the hydraulic damper 32, and as the restoring member, a biasing member formed of a synthetic resin, a rubber member, or the like may be applied in addition to the compression coil spring 33. In addition, in a case where the compression coil spring is applied as the restoring member, a plurality of compression coil springs having different spring constants may be combined and disposed so as to have a level difference in a restoring force.

REFERENCE SIGNS LIST 10, 80: amphibious vehicle
11: vehicle body
12: traveling device
13: sailing device
14, 14A, 14B, 60, 90, 100, 120: front flap device
15: rear flap device
31, 91, 121: front flap
32, 61, 92, 101: hydraulic damper (damping member)
33, 62, 93, 102: compression coil spring (restoring member)
34, 94: horizontal shaft
44, 76: flange portion
45, 46, 77: spring receiving ring
95: first front flap
96: second front flap
97: connection shaft
122: first flap plate
123: second flap
124: shock absorbing material

The invention claimed is:

1. An amphibious vehicle comprising:
a vehicle body;
a traveling device which causes the vehicle body to travel on land;
a front flap of which a distal end portion is inclined upward and a proximal end portion is rotatably supported by a front end portion of the vehicle body via a horizontal shaft;
a damping member which dampens displacement of the front flap with respect to the vehicle body; and a restoring member which restores a position of the front flap with respect to the vehicle body.

2. The amphibious vehicle according to claim 1, wherein the damping member and the restoring member are disposed in parallel between the vehicle body and the front flap.

3. The amphibious vehicle according to claim 2, wherein the damping member is a hydraulic damper, the restoring member is a compression coil spring, and the compression coil spring is disposed around the hydraulic damper.

4. The amphibious vehicle according to claim 2, wherein a plurality of the damping members are provided, and the restoring member are disposed to be arranged beside the plurality of damping members.

5. The amphibious vehicle according to claim 1, wherein the damping member and the restoring member are disposed in series between the vehicle body and the front flap.

6. The amphibious vehicle according to claim 1, wherein the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

7. The amphibious vehicle according to claim 1, wherein the front flap includes a first flap plate, a second flap, and a shock absorbing material which is disposed between the first flap plate and the second flap.

8. An amphibious vehicle comprising:
a vehicle body;
a traveling device which causes the vehicle body to travel on land;
a front flap of which a distal end portion is inclined upward and a proximal end portion is rotatably supported by a front end portion of the vehicle body via a horizontal shaft,
wherein the front flap includes a first flap plate, a second flap, and a shock absorbing material which is disposed between the first flap plate and the second flap, and
the shock absorbing material is disposed so as to fill, without gaps, a portion between the first flap plate and the second flap in a plate thickness direction of both the first flap plate and the second flap.

9. The amphibious vehicle according to claim 2, wherein the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

10. The amphibious vehicle according to claim 3, wherein the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

11. The amphibious vehicle according to claim 4, wherein the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

12. The amphibious vehicle according to claim 5, wherein the front flap includes a first front flap of which a proximal end portion is rotatably supported by the front end portion of the vehicle body via the horizontal shaft and a second front flap of which a proximal end portion is rotatably supported by a distal end portion of the first front flap via a connection shaft.

13. The amphibious vehicle according to claim 2, wherein the front flap includes a first flap plate, a second flap, and a shock absorbing material which is disposed between the first flap plate and the second flap.

14. The amphibious vehicle according to claim 3, wherein the front flap includes a first flap plate, a second flap, and a shock absorbing material which is disposed between the first flap plate and the second flap.

15. The amphibious vehicle according to claim 4 wherein the front flap includes a first flap plate, a second flap, and a shock absorbing material which is disposed between the first flap plate and the second flap.

16. The amphibious vehicle according to claim 5, wherein the front flap includes a first flap plate, a second flap, and a shock absorbing material which is disposed between the first flap plate and the second flap.

17. The amphibious vehicle according to claim 6, wherein the front flap includes a first flap plate, a second flap, and a shock absorbing material which is disposed between the first flap plate and the second flap.

18. The amphibious vehicle according to claim 8, wherein the first flap plate and the second flap are configured by fitting plate materials having a rectangular shape to each other so as to connect to each other, and are capable to be close to or away from each other in the plate thickness direction.

19. The amphibious vehicle according to claim 18, wherein the shock absorbing material is constituted by a shock absorbing gel or a shock absorbing rubber.

* * * * *